United States Patent
Shin et al.

(10) Patent No.: US 8,537,089 B2
(45) Date of Patent: Sep. 17, 2013

(54) DISPLAY DEVICE

(75) Inventors: Yong-hwan Shin, Yongin-si (KR); Sung-woon Kim, Suwon-si (KR); Hwa-sung Woo, Suwon-si (KR); Hee-seop Kim, Suwon-si (KR)

(73) Assignee: Samsung Display Co., Ltd., Yongin (KR)

( * ) Notice: Subject to any disclaimer, the term of this patent is extended or adjusted under 35 U.S.C. 154(b) by 778 days.

(21) Appl. No.: 11/970,745

(22) Filed: Jan. 8, 2008

(65) Prior Publication Data
US 2009/0058784 A1 Mar. 5, 2009

(30) Foreign Application Priority Data
Sep. 3, 2007 (KR) .................. 10-2007-0089212

(51) Int. Cl.
*G09G 3/36* (2006.01)

(52) U.S. Cl.
USPC .................. 345/96; 345/94; 345/87; 345/84; 345/55; 345/30

(58) Field of Classification Search
USPC .......... 345/96, 103, 30, 55, 87, 94; 349/123, 349/141
See application file for complete search history.

(56) References Cited

U.S. PATENT DOCUMENTS

| | | | | |
|---|---|---|---|---|
| 5,164,851 A * | 11/1992 | Kanemori et al. | ............... | 349/55 |
| 5,870,075 A * | 2/1999 | Yamazaki et al. | ............... | 345/92 |
| 6,335,771 B1 * | 1/2002 | Hiraishi | ............... | 349/42 |
| 6,704,067 B2 * | 3/2004 | Tsumura et al. | ............... | 349/42 |
| 6,760,082 B2 * | 7/2004 | Lee | ............... | 349/42 |
| 6,885,491 B2 * | 4/2005 | Ross-Messemer et al. | ... | 359/285 |
| 6,922,183 B2 * | 7/2005 | Ting et al. | ............... | 345/87 |
| 6,958,791 B2 * | 10/2005 | Shimoshikiryo | ............... | 349/85 |
| 7,154,569 B2 * | 12/2006 | Lee et al. | ............... | 349/48 |
| 7,157,303 B2 * | 1/2007 | Son | ............... | 438/74 |
| 7,486,363 B2 * | 2/2009 | Mori et al. | ............... | 349/141 |
| 7,508,385 B2 * | 3/2009 | Ueda et al. | ............... | 345/204 |
| 7,542,119 B2 * | 6/2009 | Ko et al. | ............... | 349/141 |
| 7,663,711 B2 * | 2/2010 | Yang | ............... | 349/54 |
| 7,768,610 B2 * | 8/2010 | Kim et al. | ............... | 349/139 |
| 7,982,702 B2 * | 7/2011 | Kamada et al. | ............... | 345/89 |
| 8,159,429 B2 * | 4/2012 | Kim et al. | ............... | 345/87 |
| 2001/0028429 A1 * | 10/2001 | Wu | ............... | 349/139 |
| 2005/0140897 A1 * | 6/2005 | Kim | ............... | 349/141 |
| 2005/0253797 A1 * | 11/2005 | Kamada et al. | ............... | 345/89 |
| 2006/0023151 A1 * | 2/2006 | Lee et al. | ............... | 349/141 |

FOREIGN PATENT DOCUMENTS

| | | |
|---|---|---|
| JP | 2007034151 | 2/2007 |
| KR | 19990086577 | 12/1999 |
| KR | 1020020002651 | 1/2002 |

* cited by examiner

*Primary Examiner* — Christopher E Leiby
(74) *Attorney, Agent, or Firm* — H.C. Park & Associates, PLC (57) ABSTRACT

A display device includes a first substrate, a first electrode comprising first electrode extensions formed on the first substrate, a second electrode comprising second electrode extensions formed on the first substrate and arranged alternately with the first electrode extensions, a second substrate facing the first substrate, liquid crystal molecules interposed between the first substrate and the second substrate, wherein electrode gaps formed between the first electrode extensions and the second electrode extensions comprise first electrode gaps and second electrode gaps, and the first electrode gaps are different from the second electrode gaps, and wherein the liquid crystal molecules are aligned vertically to the first and the second substrate, when the electric field is not formed between the first and the second substrate.

25 Claims, 9 Drawing Sheets

DISPLAY DEVICE

CROSS-REFERENCE TO RELATED APPLICATION

This application claims priority to and the benefit of Korean Patent Application No. 10-2007-0089212 filed on Sep. 3, 2007, in the Korean Intellectual Property Office, the entire contents of which are incorporated herein by reference.

BACKGROUND (a) Field of the Invention

The present invention relates to a display device to improve side visibility and display quality.

(b) Description of the Related Art

A liquid crystal display (LCD) is one of the most widely used flat panel displays. An LCD includes two substrates on which electrodes are formed and a liquid crystal layer that is interposed there between. When a voltage is applied to the electrodes, the electric field is generated and the liquid crystal molecules are re-arranged. The polarizers and liquid crystal molecules control the transmittance of the light to display images.

To achieve a wide viewing angle, a variety of liquid crystal modes have been developed.

In the vertical alignment mode (VA mode), when the voltage is not applied to the electrodes, the long axes of the liquid crystal molecules are vertically aligned to the substrate and a protrusion or aperture is formed on the electrode.

Also a mode having two types of linear electrodes formed on one substrate has been developed.

However, side visibility may be still distorted. So many methods have been developed to improve the side visibility.

SUMMARY

The present invention relates to a display device, more precisely a display device to improve the side visibility and to improve display quality.

A display device includes a first substrate, a first electrode comprising first electrode extensions formed on the first substrate, a second electrode comprising second electrode extensions formed on the first substrate and arranged alternately with the first electrode extensions, a second substrate facing the first substrate, liquid crystal molecules interposed between the first substrate and the second substrate, wherein electrode gaps formed between the first electrode extensions and the second electrode extensions comprise first electrode gaps and second electrode gaps, and the first electrode gaps are different from the second electrode gaps, and wherein the liquid crystal molecules are aligned vertically to the first and the second substrate, when the electric field is not formed between the first and the second substrate.

The scope of the invention is defined by the claims, which are incorporated into this section by reference. A more complete understanding of embodiments of the present invention will be afforded to those skilled in the art, as well as a realization of additional advantages thereof, through the following detailed description of one or more embodiments. Reference will be made to the appended sheets of drawings that will first be described briefly.

DETAILED DESCRIPTION

Hereinafter, embodiments of the present invention will be described in detail with reference to the accompanying drawings so as to be easily understandable to those skilled in the art. As those skilled in the art will realize, the described embodiments may be modified in various ways, all without departing from the spirit or scope of the present invention.

To clarify multiple layers and regions, the thicknesses of the layers may be enlarged in the drawings. Like reference numerals designate like elements throughout the specification. When it is said that any part, such as a layer, film, area, or plate is positioned on another part, it means the part may be directly on the other part or above the other part with at least one intermediate part. On the other hand, if any part is said to be positioned directly on another part it means that there is no intermediate part between the two parts.

A display device of an embodiment of the present invention will now be described in detail with reference to FIGS. 1 to 3.

Figure 1:
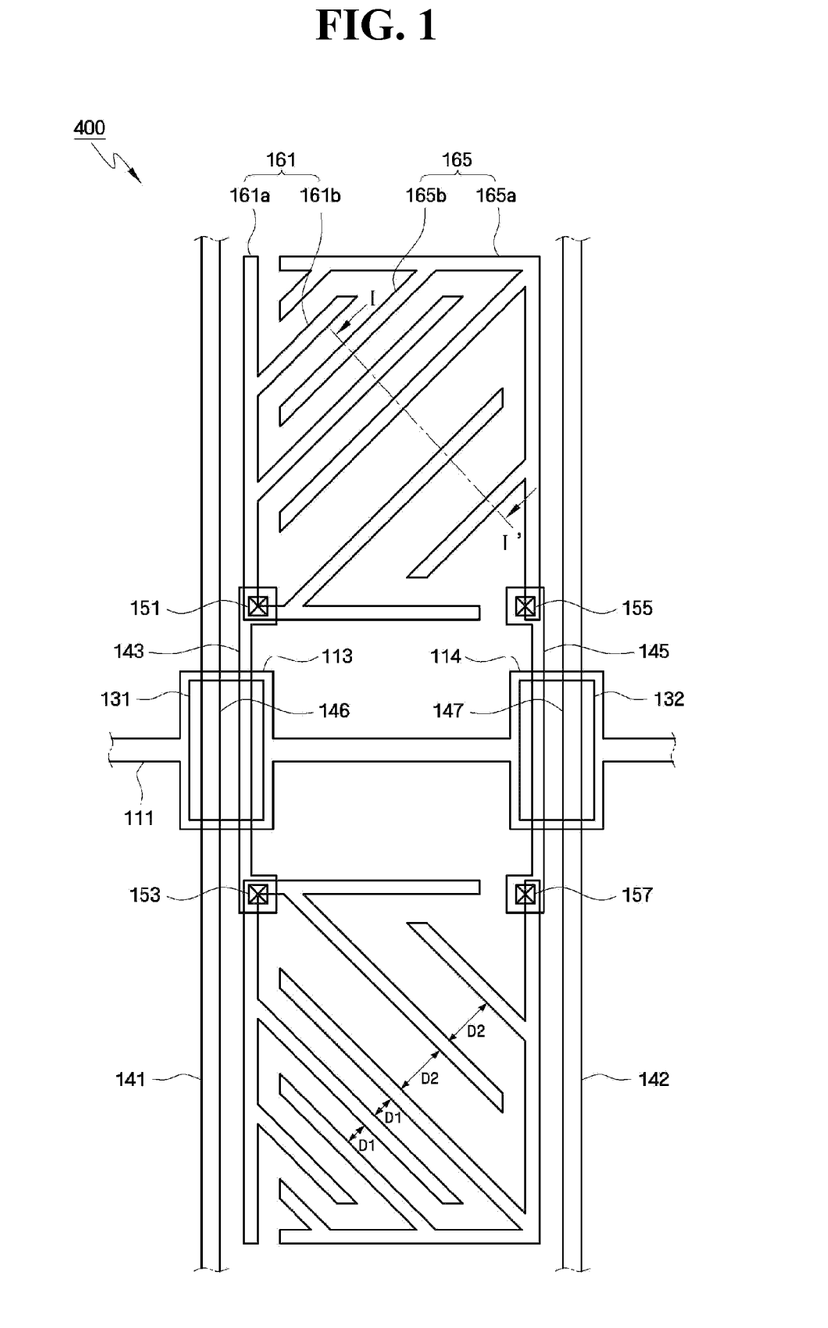
FIG. 1 shows a layout view of a display device of an embodiment of the present invention.

FIG. 1 shows a layout view of a display device of an embodiment of the present invention. FIG. 2 is a cross-sectional view taken along the line I-I' of the display device of FIG. 1, when the electric field is not formed. FIG. 3 is a cross-sectional view taken along the line I-I' of the display device of FIG. 1, when the electric field is formed.

Figure 2:
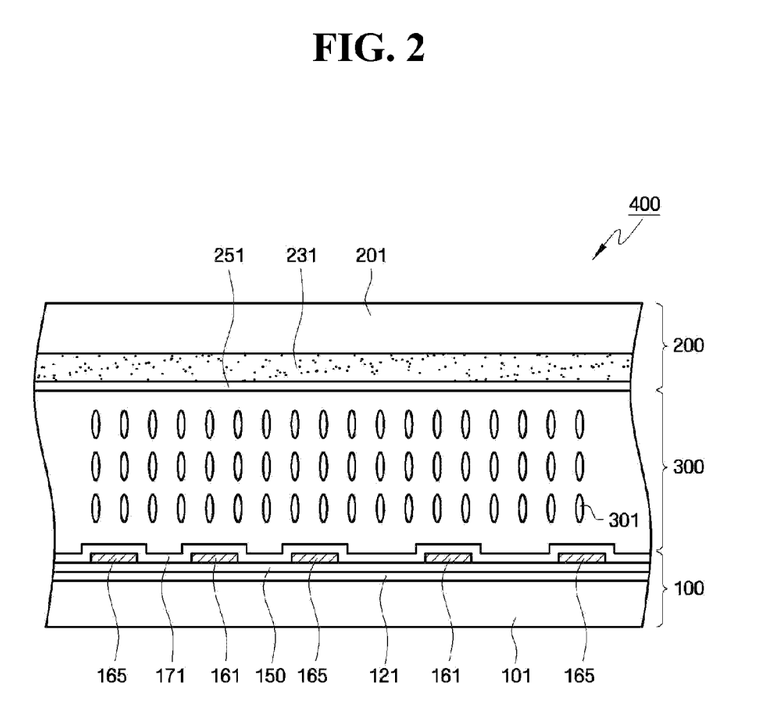
FIG. 2 is a cross-sectional view taken along the line I-I' of the display device of FIG. 1, when the electric field is not formed.
Figure 3:
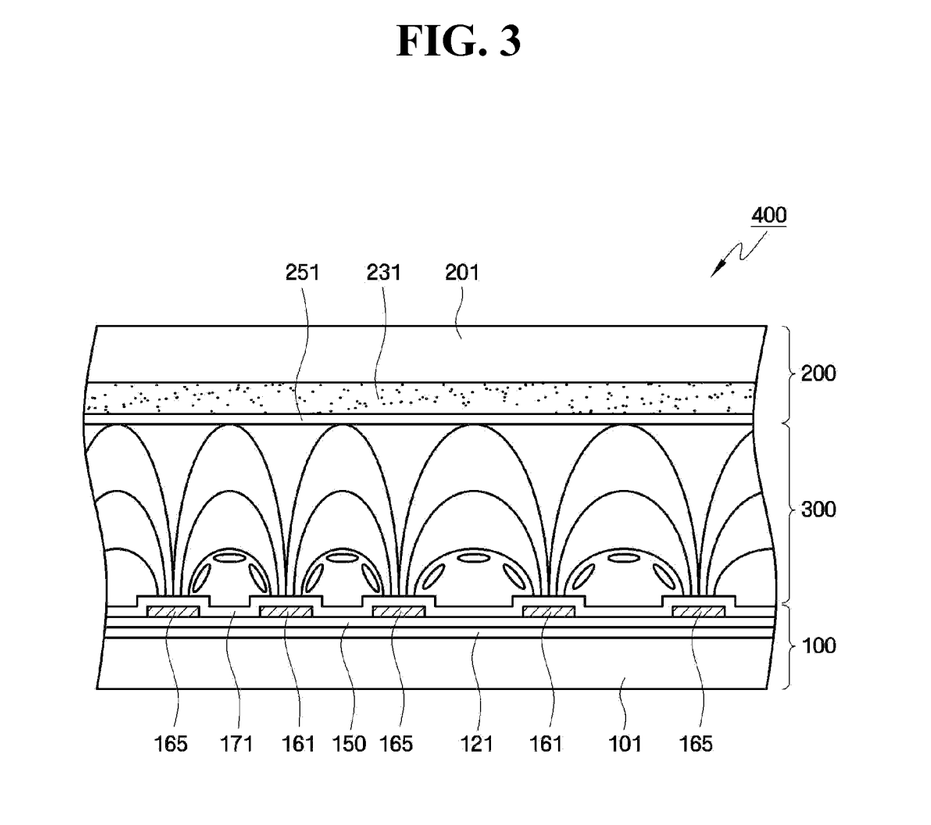
FIG. 3 is a cross-sectional view taken along the line I-I' of the display device of FIG. 1, when the electric field is formed.

Referring to FIGS. 1, 2, and 3, a display device 400 includes the first display panel 100, the second display panel 200 and a liquid crystal layer 300.

In an embodiment of the present invention, the first display panel 100 includes thin film transistors, the first electrodes 161 and the second electrodes 165 to form an electric field. Electrode gaps D1, D2 are formed between the first electrodes and the second electrodes in one pixel region. Liquid crystal molecules 301 are vertically aligned to the first substrate 101 and the second substrate 201 when the electric field is not formed between the first substrate 101 and the second substrate 201.

The first display panel 100 includes the first substrate 101. The first substrate 101 may be made of plastic or transparent glass. Gate lines 111 are formed on the first substrate 101 and extend in a horizontal direction. The gate lines 111 include gate electrodes 113, 114 that protrude up and down from the gate lines 111 and a wide end portion(not shown) to connect with other layers or outer driving circuits.

The gate lines 111 may be made of metal or a conductive material. For example, aluminum containing metals such as aluminum (Al) or aluminum alloy, silver containing metals such as silver (Ag) or silver alloy, copper containing metals such as copper (Cu) or copper alloy, molybdenum containing metals such as molybdenum (Mo) or molybdenum alloy, chromium (Cr), tantalum (Ta) and titanium (Ti) etc. The gate lines 111 may also have a multilayered structure including two conductive layers (not shown).

In an embodiment of the present invention, storage electrode lines (not shown) may be formed on the same layer as the gate lines 111.

A gate insulating layer 121 is formed on the gate lines 111. The gate insulating layer 121 may be made of silicon nitride SiNx, silicon oxide SiOx, and so on.

Semiconductors 131, 132 are formed on the gate insulating layer 121 and the semiconductors 131, 132 may be made of hydrogenated amorphous silicon (abbreviated to a-Si) or polysilicon. The semiconductors 131, 132 are overlapped with the gate electrodes 113, 114.

Ohmic contact parts (not shown) are formed on the semiconductors 131, 132. The ohmic contact parts are interposed between the semiconductors 131, 132 and data lines 141, 142 and drain electrodes 143, 145 to reduce the contact resistance there between.

Data lines 141, 142 and drain electrodes 143, 145 are formed on the ohmic contact parts and the gate insulating layer 121. The data lines 141, 142 transmit data signals and are formed in a vertical direction. The data lines 141, 142 intersect the gate lines 111. The data lines 141, 142 include source electrodes 146, 147 and a wide end portion (not shown) to connect with other layers or outer driving circuits.

In an embodiment of the present invention, the source electrodes 146, 147 are a part of the data lines 141, 142 facing the drain electrodes 143, 145. The source electrodes 146 147 do not protrude from the data lines 141, 142. But the source electrodes 146, 147 may be formed to protrude from the data lines 141, 142 and to face the drain electrodes 143, 145. In an embodiment of the present invention, the drain electrodes 143, 145 include the first drain electrode 143 and the second drain electrode 145.

The data lines 141, 142 and the drain electrodes 143, 145 may be made of metal or conductive material. For example, aluminum containing metals such as aluminum (Al) or aluminum alloy, silver containing metals such as silver (Ag) or silver alloy, copper containing metals such as copper(Cu) or copper alloy, molybdenum containing metals such as molybdenum(Mo) or molybdenum alloy, chromium (Cr), tantalum (Ta) and titanium (Ti) etc. The data lines 141, 142 may also have a multilayered structure, such as a double layer including molybdenum containing metal and aluminum containing metal and a triple layer including molybdenum containing metal, aluminum containing metal and molybdenum containing metal.

Exemplary thin film transistors (TFT) include one of the gate electrodes 113, 114 one of the data lines 141, 142, and one of the drain electrodes 143, 145. The channel of an exemplary TFT is formed at a portion of one of the semiconductors 131, 132 between the one of the drain electrodes 143,145 and the one of the data lines 141, 142.

In one embodiment of the present invention, two TFTs are formed at one pixel region, one TFT is electrically connected to the first electrode 161 and the other TFT is electrically connected to the second electrode 165.

A passivation layer 150 is formed on the data lines 141, 142 the drain electrodes 143, 145 and the exposed semiconductors 131, 132. The passivation layer 150 may be made of inorganic material such as silicon nitride (SiNx), silicon oxide (SiOx) and so on. The passivation layer 150 may also be made of organic material such as an acryl group material.

The passivation layer 150 includes contact holes 151, 153, 155, 157 to expose a portion of the first and second drain electrodes 143, 145.

The first electrodes 161 and the second electrodes 165 are formed on the passivation layer 150. The first electrodes 161 and the second electrodes 165 may be made of a transparent conducting material such as Indium-Tin-Oxide (ITO), Indium-Zinc-Oxide (IZO). To form an electric field, the different voltages may be applied between the first electrodes 161 and the second electrodes 165. In an embodiment of the present invention, the first electrodes 161 and the second electrodes 165 are formed on the same layer, but the first electrodes 161 and the second electrodes 165 may be formed on different layers.

The first electrodes 161 include the first stem electrodes 161*a* and a plurality of first electrode extensions 161*b*. A plurality of the first electrode extensions 161*b* is substantially parallel to each other. The first electrode extensions 161*b* form an oblique angle with gate line 111. The angle between gate line 111 and the first electrode extensions 161*b* may range from 0° to 60°.

In an embodiment of the present invention, the first stem electrodes 161 a include a portion which is substantially parallel to the direction of the gate line 111 and a portion which is substantially parallel to the direction of the data line 141. Also the first stem electrodes 161 a are substantially symmetrical with respect to the direction of the gate line 111. The first stem electrodes 163*a* include upper first stem electrodes 163*a* and lower first stem electrodes 163*a*.

In an embodiment of the present invention, a plurality of the first electrode extensions 161 is substantially symmetrical with respect to the direction of the gate line 111. The first electrode extensions 161*b* include the upper first electrode extensions 161*b* and the lower first electrode extensions 161*b*.

The second electrodes 165 include the second stem electrodes 165*a* and the second electrode extensions 165*b*. The shape of the second electrodes 165 is similar to the shape of the first electrodes 161. The second electrodes 165 are not connected to the first electrodes 161. Also each of the first electrode extensions 161*b* and the second electrode extensions 165*b* are arranged alternately.

The second electrodes 165 include the second stem electrodes 165*a*. In an embodiment of the present invention, the second stem electrodes 165*a* include a portion which is substantially parallel to the direction of the gate lines 111 and a portion which is substantially parallel to the direction of the data lines 141, 142.

Also the second stem electrodes 165*a* are substantially symmetrical with respect to the direction of the gate line 111. The second stem electrodes 165*a* include an upper portion of the second stem electrodes 165*a* and a lower portion of the second stem electrodes 165*a*.

In an embodiment of the present invention, the second electrode extensions 165*b* are substantially parallel to each other. The second electrode extensions 165*b* form an oblique angle with gate line 111. An angle between the direction of the gate line 111 and the direction of the second electrode extensions 165*b* may be between 0° and 60°.

In an embodiment of the present invention, the second electrode extensions 165*b* are substantially symmetrical with respect to the direction of the gate line 111. The second electrode extensions 165*b* include an upper portion of the second electrode extensions 165*b* and a lower portion of the second electrode extensions 165*b*.

In an embodiment of the present invention, the first electrode gaps D1 are formed in the first region and the second electrode gaps D2 are formed in the second region. The electrode gaps refer to the distance between the first electrode extension 161b and the second electrode extension 165b which is located next to the first electrode extension 161b. In the first region, three of the first electrode gaps D1 may be formed continuously. In the second region, two of the second electrode gaps D2 may be formed continuously. The first electrode gap D1 is different from the second electrode gap D2. In an embodiment of the present invention, the first electrode extensions 161b and the second electrode extensions 165b are formed at distances D1 and D2 from each other. However, the there may be more variations in the distance of the electrode gaps. For example, the first electrode extensions 161b and the second electrode extensions 165b may be formed at distances D1, D2, D3 (where D1, D2, D3 are different from each other).

In an embodiment of the present invention, the first electrode gap D1 and the second electrode gap D2 may be formed at a distance of between 4 um to 20 um, receptively. The width of the first electrodes 161 and the second electrodes 165 may be formed between 1 um to 6 um. The shape of the first electrodes 161 and the second electrodes may be linear.

The first electrodes 161 are electrically connected to the first drain electrodes 143 through the first contact holes 151 and the second contact holes 153. The second electrodes 165 are electrically connected to the second drain electrodes 145 through the third contact holes 155 and the fourth contact holes 157.

An alignment layer 171 may be formed on the first electrodes 161 and the second electrodes 165.

The second display panel 200 includes the second substrate 201. The second substrate 201 may be made of plastic or transparent glass. A plurality of color filters 231 is formed on the second substrate 201. An alignment layer 251 is formed on the color filters 231. Blocking layers (not shown) or overcoating layers (not shown) may be further form on the second substrate 201.

In an embodiment of the present invention the common electrode (not shown) extending over the whole surface is not formed on the second substrate 201. But the common electrode may be formed on the second substrate 201 in other embodiments of the invention.

In another embodiment of the present invention, the first alignment layer 171 and the second alignment layer 251 are homeotropic alignment layers.

In another embodiment of the present invention, a liquid crystal layer 300 may include liquid crystal molecules 301 having a property of positive dielectric anisotropy.

Now a working principal of an embodiment of the present invention will be described with reference to FIGS. 2 and 3.

Referring to FIG. 2, when the electric field is not formed between the first display panel 100 and the second display panel 200, the liquid crystal molecules 301 are vertically aligned to the first substrate 101 and second substrate 201. The polarized light passes through liquid crystal molecules 301 without changing the state of the polarization. The transmission axis of the first polarizer (not shown) and the transmission axis of the second polarizer (not shown) are vertically aligned so a black state displays.

When the electric field is formed between the first display panel 100 and the second display panel 200, a horizontal field is formed between the first electrodes 161 and the second electrodes 165. The liquid crystal molecules 301 having positive dielectric constant are aligned along with the electric field. The state of polarization changes after the light passes through the liquid crystal layer 300 and a bright state displays.

In an embodiment of the present invention, the transmission axis of the first polarizer aligns vertically to the transmission axis of the second polarizer, but the transmission axis of the first polarizer may be substantially parallel to the transmission axis of the second polarizer.

To form an electric field between the first electrodes 161 and the second electrodes 165, a variety of voltages may be applied to the first and second electrodes 161, 165. In an embodiment of the present invention, when the reference voltage is 7V, to display a white state, 14V is applied to the first electrode 161 and 0V is applied to the second electrode 165. To display a black state, 7V is applied to the first electrode 161 and the second electrode 165. Thus, each of voltages applied to the first electrode 161 and the second electrode 165 has the same value but opposite polarity.

Figure 4:
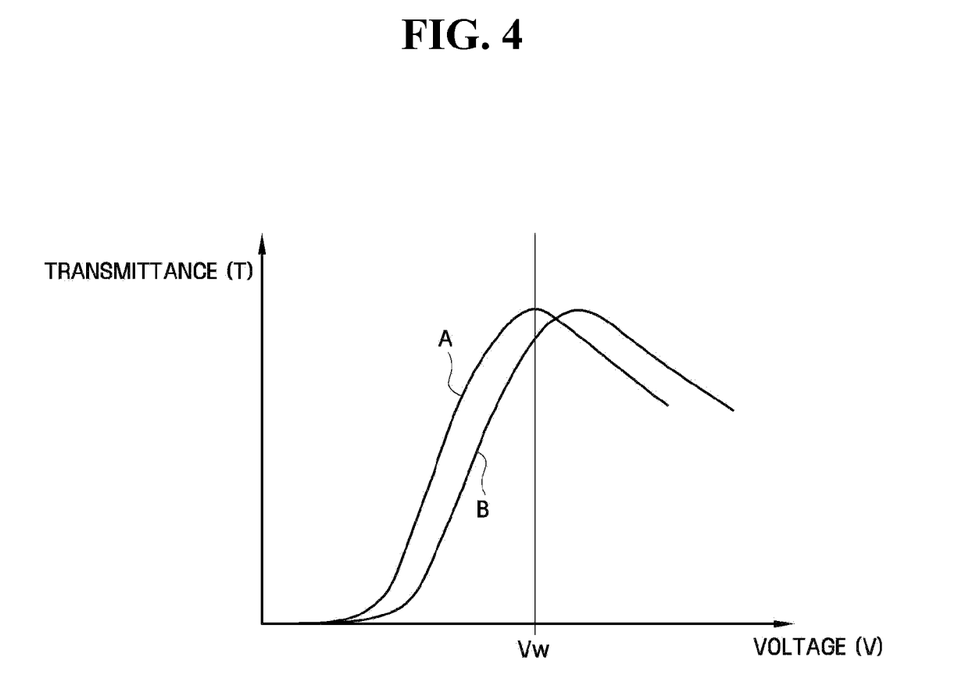
FIG. 4 is a graph of voltage to transmittance with respect to electrode gaps.

FIG. 4 is a graph of voltage (V) to transmittance (T) with respect to electrode gaps. In FIG. 4, 'A' means that the electrode gap is 9 um and 'B' means that the electrode gap is 15 um.

Referring to FIG. 4, a curve of voltage (V) to transmittance (T) is different with respect to the electrode gaps. When the electrode gap is shorter, the transmittance is higher at the same voltage. When two regions formed in one pixel region have different electrode gaps from each other, side visibility improves since there are two regions in which lying degrees of the liquid crystal molecules are different.

Referring again to FIG. 4, when the electrode gaps are formed differently, the shape of the V-T curve is different and the side visibility may improve because of a gamma mixing effect.

Figure 5:
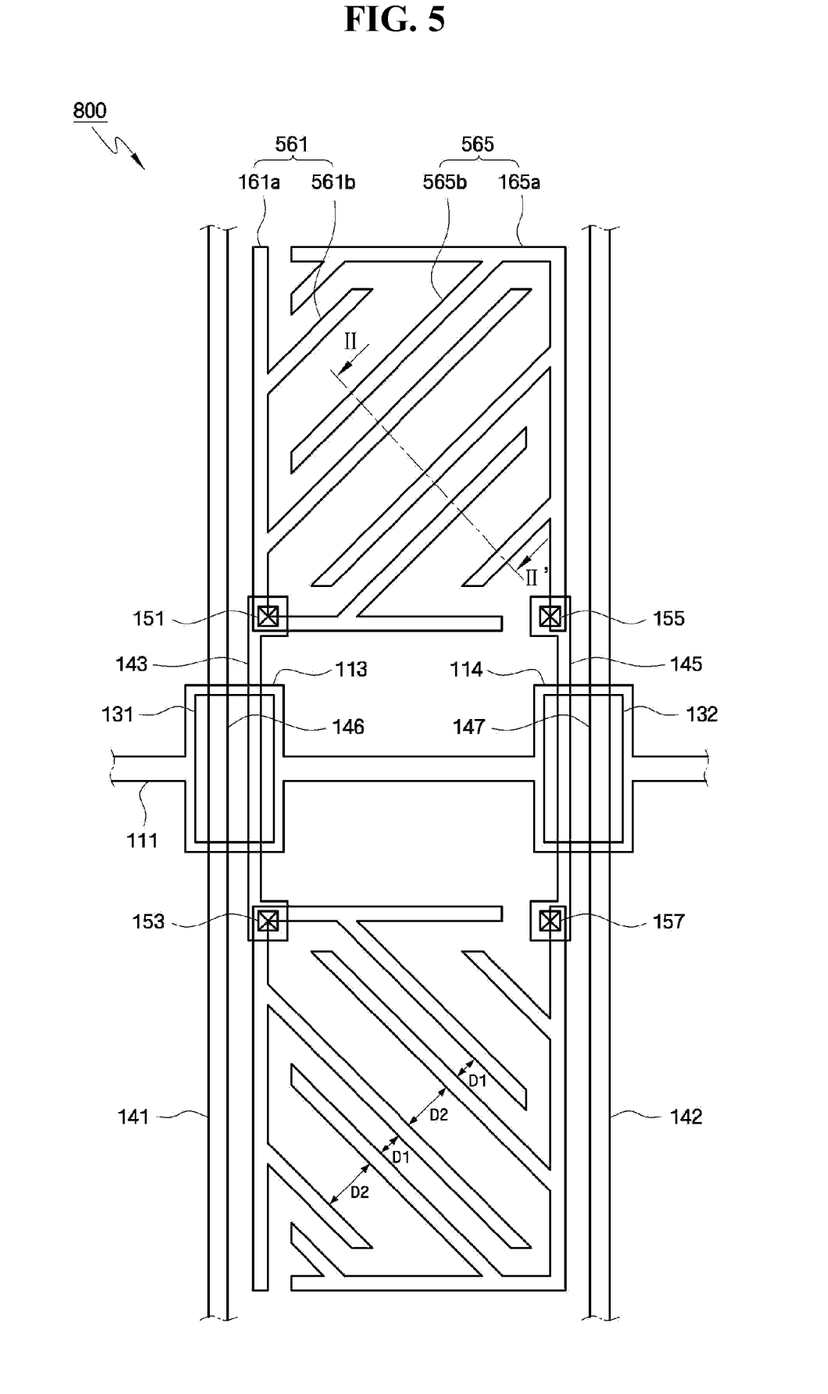
FIG. 5 shows a layout view of a display device of another embodiment of the present invention.
Figure 6:
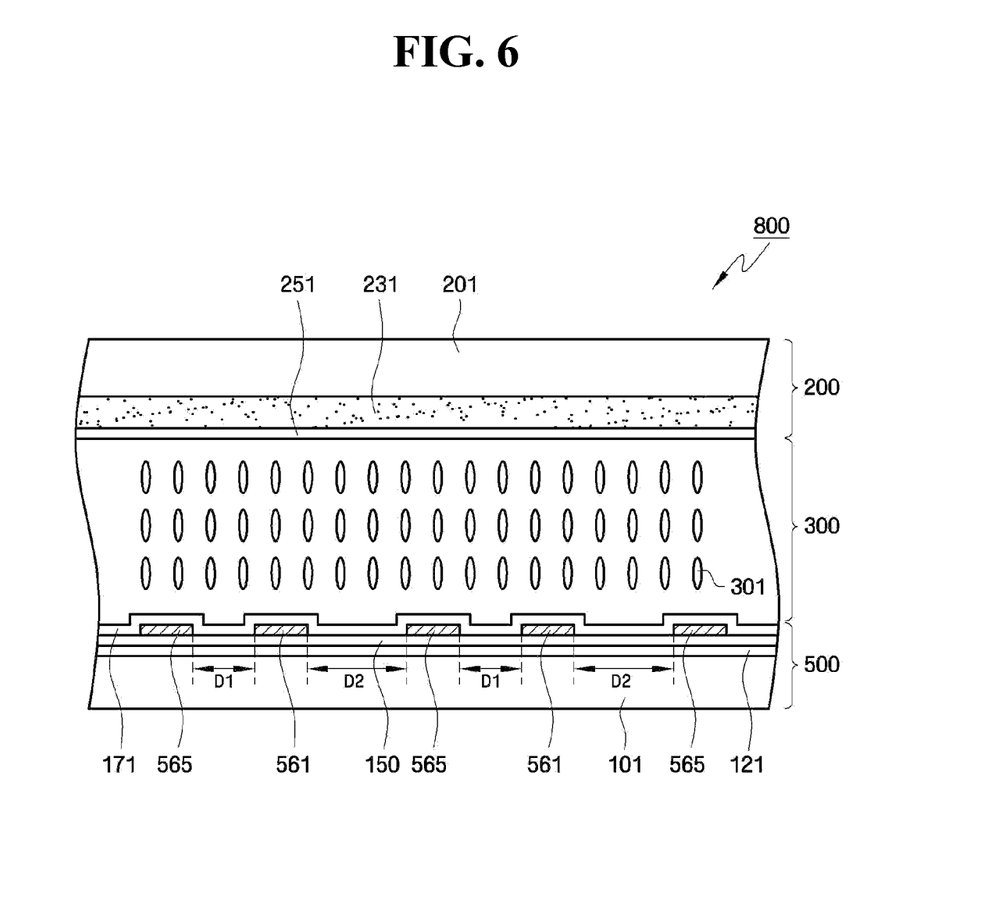
FIG. 6 is a cross-sectional view taken along the line II-II' of the display device of FIG. 5, when the electric field is not formed.
Figure 7:
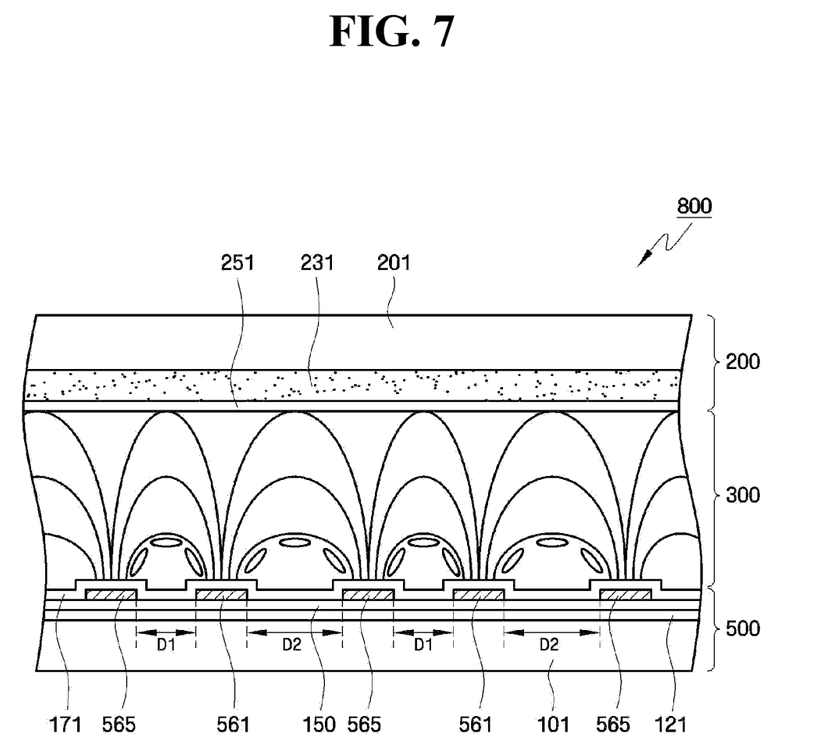
FIG. 7 is a cross-sectional view taken along the line II-II' of the display device of FIG. 5, when the electric field is formed.

A display device of another embodiment of the present invention will now be described in detail with reference to FIGS. 5, 6, and 7. FIG. 5 shows a layout view of a display device of another embodiment of the present invention, FIG. 6 is a cross-sectional view taken along the line II-II' of the display device of FIG. 5, when the electric field is not formed, and FIG. 7 is a cross-sectional view taken along the line II-II' of the display device of FIG. 5, when the electric field is formed. For explanatory convenience, components having the same functions as the components shown in the figures (FIGS. 1 to 4) illustrating the above embodiment is designated by the same reference numerals, and the descriptions thereof will be omitted. Differences will be mainly described hereinafter.

In another embodiment of the present invention, the display device 800 is similar to the display device 400 in FIGS. 1, 2, and 3. But in another embodiment of the present invention, the first electrode gap D1 and the second electrode gap D2 is formed one after the other.

In another embodiment of the present invention, the display device 800 includes the first display substrate 500, the second display substrate 200 and a liquid crystal layer 300 interposed there between.

The first display substrate 500 includes the first substrate 101, gate lines 111, a gate insulating layer 121, semiconductors 131, 132 data lines 141, 142 drain electrodes 143, 145, a passivation layer 150, the first electrodes 561, the second electrodes 565, and the first alignment layer 171.

The second display substrate 200 includes the second substrate 201, color filters 231 and the second alignment layer 251.

The liquid crystal layer 300 includes liquid crystal molecules 301 having a property of positive dielectric anisotropy.

In another embodiment of the present invention, the first alignment layer 171 and the second alignment layer 251 may be a homeotropic alignment layer.

Referring to FIGS. 6 and 7, a working principal of display device 800 is very similar to the display device 400 in FIGS. 1, 2, and 3. When the electric field is not formed between the first substrate 101 and the second substrate 201, the liquid crystal molecules 301 align vertically to the first substrate 101 and the second substrate 201.

Figure 8:
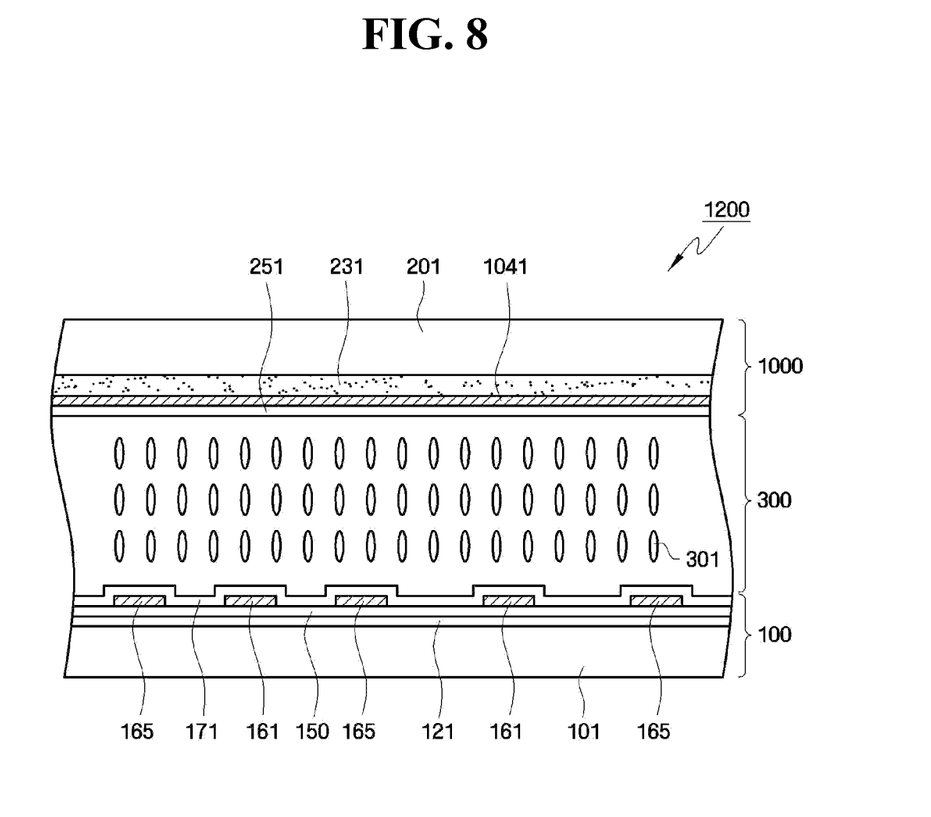
FIG. 8 is a cross-sectional view of a display device of another embodiment of the present invention.

Now, another embodiment of the present invention will now be described in detail with reference to FIG. 8. FIG. 8 is a cross-sectional view of a display device of another embodiment of the present invention. For explanatory convenience, components having the same functions as the components shown in the figures (FIGS. 1 to 4) illustrating the above embodiment are designated by the same reference numerals, and the descriptions thereof will be omitted. Differences will be mainly described hereinafter.

Referring to FIG. 8, the display device 1200 is similar to the display device 400 in FIG. 1, FIG. 2 and FIG. 3.

But in another embodiment of the present invention, the display device 1200 includes the first electrodes 161 and the second electrodes 165 formed on the first substrate 101 and the third electrode 1041 formed on the second substrate 201.

The third electrode 1041 may be a whole surface electrode without a special pattern such as apertures or slits. The reference voltage may be applied to the third electrode 1041.

The first electrodes 161 and the second electrodes 165 receive voltages that differ symmetrically in magnitude, with respect to a reference voltage.

For example when the reference voltage is 7V, to display a white state, 14V is applied to the first electrodes 161. 0V is applied to the second electrodes 165 and 7V is applied to the third electrode 1041. To display a black state, 7V is applied to the first electrodes 161, the second electrode 165 and the third electrode 1041.

Figure 9:
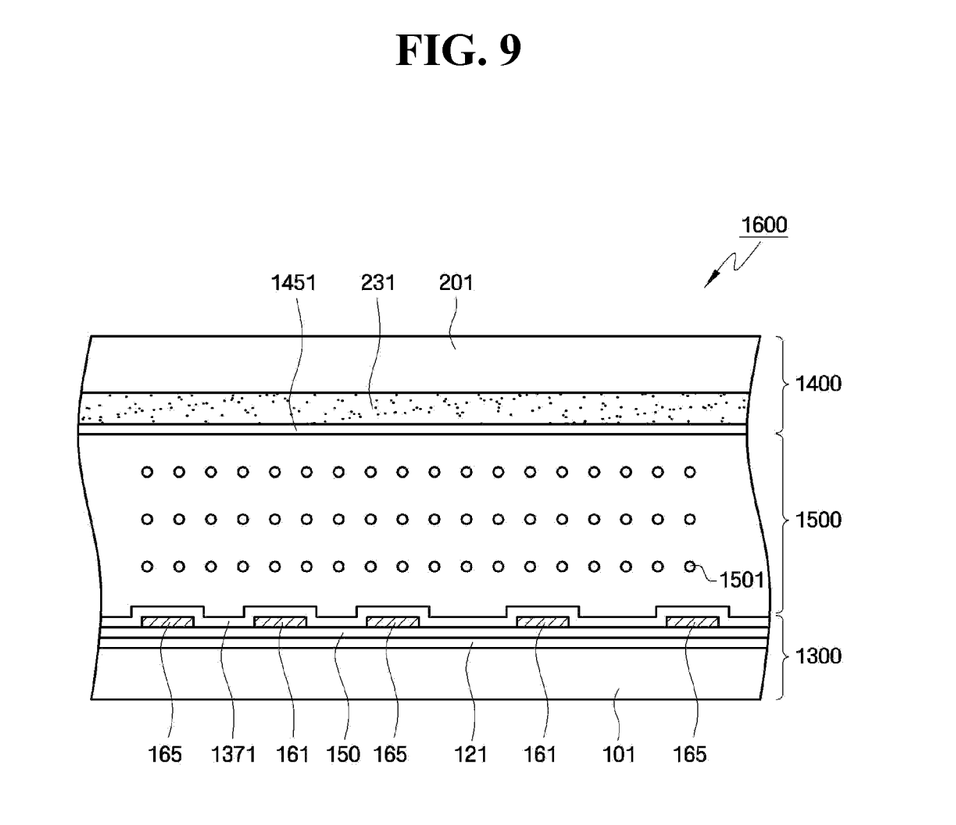
FIG. 9 is a cross-sectional view of a display device of another embodiment of the present invention.

Now another embodiment of the present invention will now be described in detail with reference to FIG. 9. FIG. 9 is a cross-sectional view of a display device of another embodiment of the present invention. For explanatory convenience, components having the same functions as the components shown in the figures (FIGS. 1 to 4) illustrating the above embodiment are designated by the same reference numerals, the descriptions thereof will be omitted. Differences will be mainly described hereinafter Referring to FIG. 9, the display device 1600 is similar to the display device 400 in FIGS. 1, 2, and 3. But in another embodiment of the present invention, when the electric field is not formed between the first display panel 1300 and the second display panel 1400, liquid crystal molecules 1501 align parallel to the first substrate 101 and the second substrate 201.

In another embodiment of the present invention, the first alignment layer 1371 and the second alignment layer 1451 make the liquid crystal molecules 1501 align parallel to the surface. The first alignment layer 1371 and the second alignment layer 1451 may be rubbed in a predetermined direction.

As described above, the side visibility of the display device may be improved and the display quality may be also improved.

While embodiments of the present invention have been described in detail above, it will be understood by those skilled in the art that various changes in form and details may be made therein without departing from the spirit and scope of the present invention. For example, although the present invention was described above based on four processes, the present invention can be used for three processes. Accordingly, the scope of the invention is defined only by the following appended claims.

What is claimed is:

1. A display device, comprising:
a first substrate;
a first pixel electrode configured to receive a first voltage in accordance with a gate signal, the first pixel electrode comprising first electrode extensions formed on the first substrate;
a second pixel electrode configured to receive a second voltage in accordance with the gate signal, the second pixel electrode comprising second electrode extensions formed on the first substrate and interspersed with the first electrode extensions;
a second substrate facing the first substrate; and
liquid crystal molecules interposed between the first substrate and the second substrate,
wherein electrode gaps formed between the first electrode extensions and the second electrode extensions comprise first electrode gaps and second electrode gaps, and the first electrode gaps are different from the second electrode gaps,
wherein the liquid crystal molecules are aligned vertically to the first and the second substrate, when the electric field is not formed between the first and the second substrate, and
wherein the first voltage differs from the second voltage except while displaying a black state,
wherein while displaying the black state the first and second voltages are opposite in polarity, and
wherein each of the first and second voltages while displaying the black state is a non-zero voltage.

2. The display device of claim 1, wherein the first electrode gaps are formed at a first region and the second electrode gaps form at a second region.

3. The display device of claim 2, further comprising a gate line formed on the first substrate and a data line intersecting the gate line.

4. The display device of claim 3, wherein the first electrode extensions are substantially parallel to each other.

5. The display device of claim 4, wherein the first electrode extensions extend obliquely with respect to a direction of the gate line.

6. The display device of claim 3, wherein the second electrode extensions are substantially parallel to each other.

7. The display device of claim 6, wherein the second electrode extensions extend obliquely with respect to a direction of the gate line.

8. The display device of claim 1, wherein the widths of the first electrode gaps and the second electrode gaps range from 4 um to 20 um.

9. The display device of claim 1, wherein the first electrode gaps and the second electrode gaps are formed one after the other.

10. The display device of claim 1, wherein the first voltage and the second voltage differ symmetrically in magnitude with respect to a reference voltage.

11. The display device of claim 1, wherein the first electrode and the second electrode are disposed directly on the same layer.

12. The display device of claim 1, wherein the first pixel electrode is further configured to receive the first voltage as one of a plurality of first voltages and the second pixel electrode is further configured to receive the second voltage as one of a plurality of second voltages.

13. The display device of claim 1, wherein the first pixel electrode comprises at least two first extensions and the second pixel electrode comprises at least two second extensions, and wherein one of the at least two first extensions is spaced from each of the at least two second extensions by a first electrode gap, and wherein the other one of the at least two first extensions is spaced from at least one of the at least two second extensions by a second electrode gap.

14. The display device of claim 1, wherein the electrode gaps formed between the first electrode extensions and the second electrode extensions are alternated between the first electrode gaps and the second electrode gaps.

15. The display device of claim 1, wherein the first voltage is a first data voltage and the second voltage is a second data voltage.

16. A display device, comprising:
a first substrate;
a gate line formed on the first substrate;
a first data line and a second data line that intersect the gate line;
a first pixel electrode configured to receive a first voltage from the first data line, the first pixel electrode comprising first electrode extensions formed on the first substrate and to receive the signal from the first data line;
a second pixel electrode configured to receive a second voltage from the second data line, the second pixel electrode comprising second electrode extensions formed on the first substrate and interspersed with the first electrode extensions;
a second substrate facing the first substrate; and
liquid crystal molecules interposed between the first substrate and the second substrate,
wherein electrode gaps between the first electrode extensions and the second electrode extensions have at least two different values, and
wherein the first voltage differs from the second voltage except while displaying a black state,
wherein while displaying the black state the first and second voltages are opposite in polarity, and
wherein each of the first and second voltages while displaying the black state is a non-zero voltage.

17. The display device of claim 16, wherein the liquid crystal molecules have a positive dielectric anisotropy.

18. A display device comprising:
a pixel area;
a first pixel electrode disposed in the pixel area and configured to receive a first voltage in accordance with a gate signal, the first pixel electrode comprising a first electrode extension and a second electrode extension;
a second pixel electrode configured to receive a second voltage in accordance with the gate signal, the second pixel electrode comprising:
a third electrode extension spaced away from the first electrode extension by a distance D1; and
a fourth electrode extension spaced away from the second electrode extension by a distance D2,
wherein the first voltage differs from the second voltage except while displaying a black state,
wherein while displaying the black state the first and second voltages are opposite in polarity, and
wherein each of the first and second voltages while displaying the black state is a non-zero voltage.

19. A method for manufacturing a display device, the method comprising:
forming, in a pixel area, a first pixel electrode configured to receive a first voltage in accordance with a gate signal, the first pixel electrode comprising a first electrode extension and a second electrode extension;
forming, in the pixel area, a second pixel electrode configured to receive a second voltage in accordance with the gate signal, the second pixel electrode comprising:
a third electrode extension spaced away from the first electrode extension by a distance D1; and
a fourth electrode extension spaced away from the second electrode extension by a distance D2,
wherein the first voltage differs from the second voltage except while displaying a black state,
wherein while displaying the black state the first and second voltages are opposite in polarity, and
wherein each of the first and second voltages while displaying the black state is a non-zero voltage.

20. A display device, comprising:
a first substrate;
a gate line formed on the first substrate and extended in a first direction;
a data line intersecting the gate line and extended in a second direction;
a first electrode configured to receive a first voltage in accordance with a gate signal, the first electrode comprising first stem electrodes and first electrode extensions formed on the first substrate in association with a pixel of the display device;
a second electrode configured to receive a second voltage in accordance with the gate signal, the second electrode comprising second stem electrodes and second electrode extensions formed on the first substrate in association with the pixel;
a second substrate facing the first substrate;
a common electrode formed on the second substrate in association with the pixel; and
liquid crystal molecules interposed between the first substrate and the second substrate, wherein the first stem electrodes include a portion which is parallel to the first direction of the gate line and a portion which is parallel to the second direction of the data line, respectively,
wherein the second stem electrodes include a portion which is parallel to the first direction of the gate line and a portion which is parallel to the second direction of the data line, respectively,
wherein the first electrode extensions and the second electrode extensions are extended in a third direction different from the first direction and the second direction, respectively, and
wherein the first voltage differs from the second voltage except while displaying a black state,
wherein while displaying the black state the first and second voltages are opposite in polarity, and
wherein each of the first and second voltages while displaying the black state is a non- zero voltage.

21. The display device of claim 20, wherein the first electrode extensions form an oblique angle with gate line and the angle between gate line and the first electrode extensions ranges from 0° to 60°, and
wherein the second electrode extensions form an oblique angle with gate line and the angle between gate line and the second electrode extensions ranges from 0° to 60°.

22. The display device of claim 20, wherein electrode gaps between the first electrode extensions and the second electrode extensions are formed continuously.

23. The display device of claim 20, wherein electrode gaps between the first electrode extensions and the second electrode extensions have three different values.

24. The display device of claim 20, wherein electrode gaps between the first electrode extensions and the second electrode extensions are formed at a distance of between 4 μm to 30 μm.

25. The display device of claim 20, wherein widths of the first electrode extensions and the second electrode extensions are formed between 1 μm to 6 μm.

* * * * *